United States Patent Office 3,681,090
Patented Aug. 1, 1972

3,681,090
METHOD FOR MANUFACTURING PRACTICALLY STERILE, CONCENTRATED AROMAS OF SPICES, VEGETABLES AND MUSHROOMS
Heinz Huth, Holzminden, Germany, assignor to Dragoco Spezialfabrik Konz, Riech- und Aroma-Stoffe Gerberding & Co. GmbH, Holzminden, Germany
No Drawing. Filed May 26, 1970, Ser. No. 40,709
Claims priority, application Germany, May 29, 1969,
P 19 27 228.7
Int. Cl. A23l 1/22
U.S. Cl. 99—140 R     5 Claims

ABSTRACT OF THE DISCLOSURE

Method for manufacturing sterile concentrated aromas of spices, vegetables and mushrooms in the form of pastes or powders, which are soluble in water and have, in the aqueous solution, the typical taste ad smell of the cooked spices, vegetables and mushrooms. The method comprises cutting the starting materials to small pieces, mixing with water, heating from 90–150° C., cooling to below 55° C., separating the liquid from the solids, depectinizing, uperizing and finally concentrating the resulting aroma producing material.

---

The invention relates, as indicated, to a method for manufacturing practically sterile, concentrated aromas of spices, vegetables and mushrooms.

It is the object of the invention to provide a method for manufacturing lasting aromas of vegetable raw materials in the form of pastes and powders, soluble in water and having in the aqueous solution, the typical smell and taste of the cooked raw materials.

It is known that spices, vegetables and mushrooms are added in the kitchen to soups, sauces, gravies, and other dishes. These products are used either as raw materials or as dried materials also in the industrial production of such food stuffs. In the conventional production methods used for making soups, gravies or sauces, the required seasoning substances are formed from the vegetables or mushrooms added directly by the cooking or sterilizing process. In the production of the concentrated and germ-free, i.e. durable "instant" products according to the invention, the cooking process is eliminated. These products impart to the foods the taste of products cooked with addition of the raw materials under review by simply dissolving them in water or in aqueous preparations without any cooking time.

It is already known to subject vegetables or fruit to a steam treatment in order to open up the sap cells and to expel the sap. According to this method, the raw materials are boiled for a considerable time in order to produce the largest possible quantity of extract. However, this is achieved at the expense of the aroma because the aromatic oils are wholly or mainly destroyed in the process. It has also been proposed to recondense the aromatic substances escaping during the cooking and to add the condensate to the extract.

According to the invention, vegetable raw materials such as, e.g. carrots, celery, leek, red pepper, parsley root, mushrooms, asparagus and the like, are reduced to small pieces with diameters of less than 10 mm., mixed with water in the ratio of 1:05–2 parts by weight, heated to temperatures between 90° C. and 150° C., and preferably between 100 and 130° C., then cooled to temperatures between about 55° C. and room temperature, followed by separating the liquid from the solids in a suitable device, depectinization, uperization at temperatures between 140 and 150° C. and finally concentration in an evaporator. The volatile aromatic substances can be dissolved out from the evaporated liquid with organic solvents, concentrated and added to the extract concentrate. The invention will be further described by way of example, indicating further features and details thereof.

The fresh raw materials, for example vegetables, are first washed and then cut to small pieces, measuring about 5 to 10 mm. in a suitable device. Unless the vegetable pulp can be pumped in this state, it is mixed with a sufficient quantity of water, usually in the ratio of about 1:0.5–2 parts by weight and is then immediately heated. The heating of the vegetable pulp may be carried out continuously or intermittently. In the continuous method, the pulp is pumped through a suitable heater, for example a tubular heater with indirect steam heating and is cooled after the heating in a tubular cooler with cooling water. In the intermittent method, the pulp is heated and cooled in an open or closed vessel under agitation. Conveniently, the heating temperature may be varied between 100° C. and 130° C. At 100° C., about 20 minutes are required for the full development of the desired cooking aroma, and at 130° C. about 1 minute. Generally, it may be said that heating temperature and heating duration are substantially inversely proportional.

Immediately after the heating, back cooling is carried out to about room temperature to 70° C. and the material is treated in a suitable device, for example in a filtering press, in order to separate the aqueous extract from the insoluble, almost tasteless residue.

Next, the extract treated with enzymes for splitting pectin, to make possible a subsequent concentration to high solid values. Then, the turbid substances are removed from the extract by centrifuging and the same is rendered germ-free by uperization at 140 to 150° C. for a few seconds. The resulting concentration is achieved in a thin layer evaporator to about 75% dry solids. The thin layer evaporator operates in a vacuum with a short dwell time of the material in the evaporator. The liquid temperatures are between +18° C. and +40° C. and the vacuum is maintained between 15 and 55 torr. The concentrates produced in this manner are durable at room temperature without the addition of preservatives. They are pasty to liquid. The extracts may be transformed into durable powders by adding suitable carriers, such as e.g., glucose syrup, gum arabic and the like, in weight proportions of about 50%.

The volatile aromatic substances are washed out of the liquid condensate by suitable solvents. Suitable extraction agents are preferably benzol and low boiling point organic solvents such as e.g., pentane, methylene chloride, dichloroethane, monofluorothichloromethane. These extracts can be added to the concentrated extracts. They may be concentrated by evaporation and may be dried either alone or together with the main concentrate. Prior to the drying, the concentrate or concentrates are dissolved in about 10 times the amount of a special edible oil, having a very long duration stability without the addition of antioxidants ("long stability oil" by Durkee). Such oils (see also, for example, "Miglyol 812" a product of the Dynamit-Nobel-AG) serve as carrier substances for the aromatic concentrates, produced by means of the extracting agents, during the manufacture of dry products. They retain the volatile aromatic substances during the drying. In addition, the addition of edible oil improves the stabilization of the volatile aromatic substances during storage and prevents the baking together of the powder. This may also be achieved by using edible fats with higher melting points (e.g. "Vitcocan H") which release the aromatic substances only at higher temperatures which may be desirable with various foodstuffs.

After homogenizing the concentrate or concentrates with the additions of carrier substances and special oils or edible fats, they may be converted into dry products. Spray drying is a method which is suitable for this purpose. The volatile aromatic substances dissolved in the edible oil are largely retained in the product.

The following are non-limitative examples to illustrate the process:

EXAMPLE 1

1000 kg. of fresh carrots (without leaves) are washed, subsequently crushed continuously in a mill having perforated discs to chips of an average edge length of about 5 mm. The crushed mass is mixed with 1000 kg. of water in a vessel with stirring. This mixture is continuously heated in a tubular heater to 125° C., kept hot for 5 minutes, then cooled to 55° C. The hot mass is subsequently charged into a packing press and expressed from the insoluble portion. 0.5 kg. of the pectolytic enzyme preparation "Pectinol" (Röhm and Haas, Darmstadt) are added to the resultant 1830 kg. of liquid and the mixture is stirred for about one hour for pectin decomposition. Then the liquid is continuously passed through a clarifying separator, then heated to 150° C. for two seconds in an ultrahigh heater, cooled down to 60° C. and then concentrated in a film evaporator at a vapor temperature of about 35° C. and a vacuum of about 42 torr to a dry substance content of about 75%. Yield of concentrate (I) about 72 kg.

The vapors from the evaporator are condensed by means of an air condensor. The 1750 kg. of vapor condensate produced are continuously extracted in a mixer and separator centrifuge with 300 liters of benzene. The benzene is distilled off from the aroma solution under normal pressure down to 10 liters and subsequently the benzene is completely distilled off from the aroma substances in a vacuum column. 16 grams of aroma concentrate (II) are obtained.

Concentrates I and II are mixed. 0.5 gram of this mixture, dissolved in 100 grams of water, smells and has an excellent flavor of cooked carrot.

For the purpose of producing a dry product, 1.6 grams aroma concentrate (II) are dissolved in 14 grams of Miglyol 812 (Dynamit-Nobel-AG, a neutral, stabilized, low-viscosity oil on vegetable base, triglyceride mixture) and emulsified together with 7.2 kg. of concentrate (I) at about 55° C. in a colloid mill. This mixture is mixed with 8 kg. of a 50% gum arabic solution in water and spray-dried. A free-flowing powder results which is stable under storing.

1 gram of this powder, dissolved in 100 g. of water, smells and has an excellent flavor of cooked carrot.

EXAMPLE 2

200 kg. of dry thyme leaves are chopped in a chopping machine to bits of about 2 mm. length. A closable stirrer vessel with heating jacket is charged with 400 kg. of water of about 60° C., the chopped herb then being added with stirring. The mixture is heated for about 10 minutes to 120° C., then cooled down to 70° C. and continuously expressed in a screw press from the insoluble residue. The resultant 442 kg. of liquid are continuously passed through a clarifying separator, then heated to 145° C. for 3 seconds, cooled down to 60° C. and further processed in a film evaporator as described in Example 1. The yield is 45 kg. of concentrate (I) with 80% of dry substance. The vapors of the evaporator are reprocessed in analogy to Example 1. Methylene chloride is used as extracting agent. The yield is 0.7 kg. of aroma concentrate (II).

Concentrate (I) and aroma concentrate (II) are emulsified in a colloid mill at +50° C.; 50 mg. of the mixture, dissolved in 100 grams of water smell and have an excellent flavor of cooked thyme herb.

EXAMPLE 3

Following the method described in Example 1 utilizing 1000 kg. mushrooms resulted in an aroma of excellent taste and smell in the form of a concentrate as well as in the form of a dry product.

The products obtained by this method are easily dissolved in water without cloudiness. The extracts and their solutions have the taste typical for their respective raw materials.

The yields of paste-like aromatic substance, related to the filter press liquids condensed to about 75% solids content and mixed with the aromatic liquid, amount to about 5% to 10% of the fresh raw materials used.

The products manufactured according to the invention are used preferably in the soup industry. Here, they may replace raw materials, where these are used only in order to determine the taste. They may, of course, also be used to enhance the taste by supplementing the usual starting materials.

The individual steps of the invention are shown, in the form of a diagrammatical flow diagram, below.

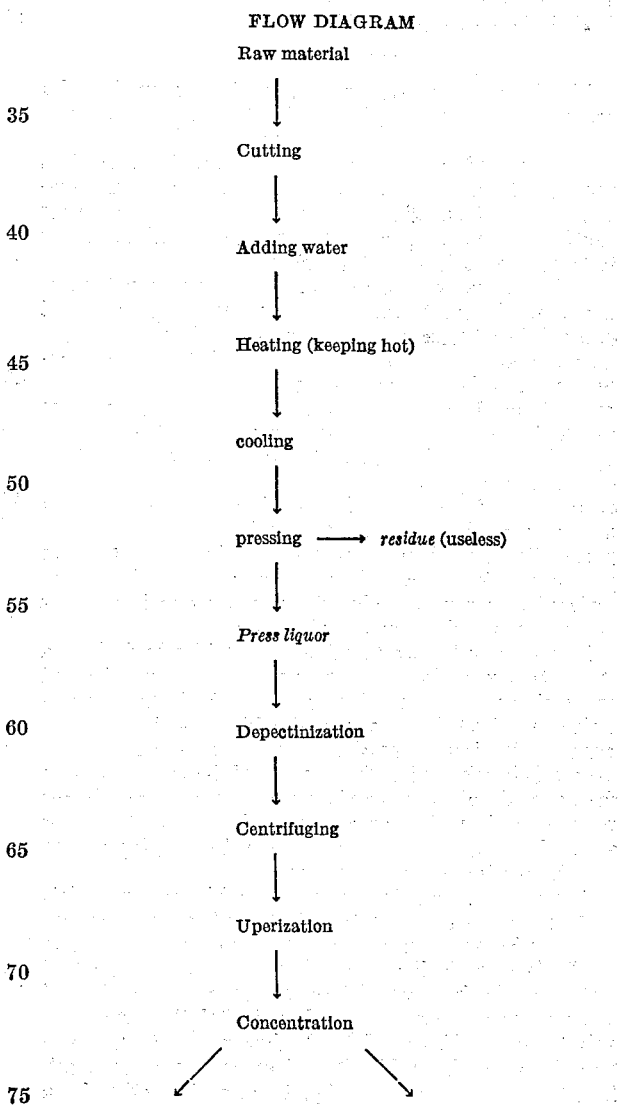

FLOW DIAGRAM

Raw material
↓
Cutting
↓
Adding water
↓
Heating (keeping hot)
↓
cooling
↓
pressing ⟶ *residue* (useless)
↓
*Press liquor*
↓
Depectinization
↓
Centrifuging
↓
Uperization
↓
Concentration

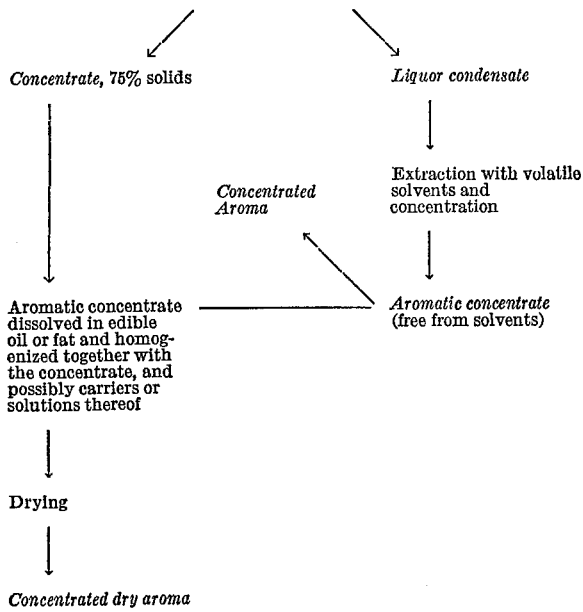

What is claimed is:

1. A method for manufacturing sterile, concentrated aromas of spices, vegetables and mushrooms comprising cutting spice, vegetable, or mushroom starting materials to small pieces of less than 10 mm. diameter, mixing with water in the proportion of 1:0.5–2 parts by weight, heating to temperatures between 100° C. and 130° C. for 20 to 1 minutes then immediately cooling to temperatures between about 70° C. and room temperature, followed by separating the liquid from the solids in a suitable apparatus, depectinization, uperization at temperatures between 140° C. and 150° C. for a few seconds, and finally concentration in an evaporator.

2. A method as set forth in claim 1 wherein the volatile aromatic substances are washed out of the evaporator liquors with organic solvents, and concentrated.

3. A method as set forth in claim 2 wherein the concentrate obtained is added to the extract concentrate obtained.

4. A method in accordance with claim 1 wherein the uperization is carried out for 2–3 seconds.

5. Practically sterile, concentrated aromas of vegetables, spices and mushrooms made in accordance with the method of claim 1.

References Cited

UNITED STATES PATENTS 3,424,592   1/1969   Huth _____ 99—140

OTHER REFERENCES

"Enzyme Topics," No. 3, May 1964, published by Rohm & Haas Co., Philadelphia, Pa., pp. 1–4.

MORRIS O. WOLK, Primary Examiner

W. R. BOVEE, Assistant Examiner

U.S. Cl. X.R.

99—106, 205, 211